United States Patent
Liu et al.

(10) Patent No.: US 6,694,060 B2
(45) Date of Patent: Feb. 17, 2004

(54) FRAME BIT-SIZE ALLOCATION FOR SEAMLESSLY SPLICED, VARIABLE-ENCODING-RATE, COMPRESSED DIGITAL VIDEO SIGNALS

(75) Inventors: Vincent Liu, San Diego, CA (US); Jingyang Chen, San Diego, CA (US); Siu-Wai Wu, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 589 days.

(21) Appl. No.: 09/746,347

(22) Filed: Dec. 21, 2000

(65) Prior Publication Data

US 2002/0118747 A1 Aug. 29, 2002

(51) Int. Cl.$^7$ .............................. G06K 9/36; G06K 9/46
(52) U.S. Cl. .................... 382/236; 382/239; 375/240.03
(58) Field of Search ................................. 382/232, 233, 382/239, 236; 345/555; 348/384.1; 358/426.01–426.16; 375/122, 240.01–240.2; 708/203

(56) References Cited

U.S. PATENT DOCUMENTS

| | | | | |
|---|---|---|---|---|
| 5,719,986 A | * | 2/1998 | Kato et al. .................. | 386/109 |
| 5,877,814 A | * | 3/1999 | Reininger et al. .......... | 348/500 |
| 6,091,776 A | * | 7/2000 | Linzer .................... | 375/240.12 |
| 6,151,360 A | * | 11/2000 | Kato et al. ............. | 375/240.03 |
| 6,404,812 B1 | * | 6/2002 | Martins et al. ........ | 375/240.05 |
| 6,483,543 B1 | * | 11/2002 | Zhang et al. ............ | 348/390.1 |
| 6,493,388 B1 | * | 12/2002 | Wang .................... | 375/240.12 |
| 2003/0043923 A1 | * | 3/2003 | Zhang et al. .......... | 375/240.27 |

FOREIGN PATENT DOCUMENTS

WO     WO 00/19726       4/2000

OTHER PUBLICATIONS

Test Model 5, Coded Representation of Picture and Audio Information, ISO–IEC/JTC1/SC29/WG11, MPEG93/457, Document AVC–491, Version 1, Apr. 1993, pp 61–62.

Test Model 3, Coded Representation of Picture and Audio Information, ISO–IEC/JTC1/SC29/WG11, NO328, Document AVC–400, Nov. 1992, p. 34.

* cited by examiner

Primary Examiner—Timothy M. Johnson
Assistant Examiner—Barry Choobin
(74) Attorney, Agent, or Firm—Edward W. Callan

(57) ABSTRACT

A controller allocates a bit size for a current frame in a group of pictures of a first compression-encoded digital video signal that is to be spliced following transmission of the group of pictures with a second compression-encoded digital video signal. The signals are spliced after a predetermined switching time. The spliced signals are buffered by a decoder buffer and then decoded by a decoder. When the second signal has a variable bit-encoding rate and the current frame is not decoded until after the predetermined switching time, the maximum bit size is determined in accordance with an estimate of the decoder buffer fullness at the predetermined switching time. When the second signal has a predetermined maximum variable bit-encoding rate and the current frame is not decoded until after the predetermined switching time, the minimum bit size is determined in accordance with the predetermined maximum bit-encoding rate of the second signal.

28 Claims, 2 Drawing Sheets

FRAME BIT-SIZE ALLOCATION FOR SEAMLESSLY SPLICED, VARIABLE-ENCODING-RATE, COMPRESSED DIGITAL VIDEO SIGNALS

BACKGROUND OF THE INVENTION

The present invention generally pertains to digital video compression, and is particularly directed to allocating a frame bit-size in a group of pictures of a first compression-encoded digital video signal that is to be spliced following transmission of the group of pictures with a second compression-encoded digital video signal.

Referring to FIG. 1, a prior art digital video compression-and-decompression system that is adapted for splicing a compression-encoded digital video signals includes a controller 10, an encoder 12, an encoder output buffer 14, a signal splicer/multiplexer 16, a decoder input buffer 18 and a decoder 20. The encoder 12 compress the bit size of each frame in each group of pictures of a first digital video signal 22a into a variable allocated number of bits. The encoder 12 concatenates the compressed frames to provide a first compression-encoded digital video signal 24a, which is transmitted from the encoder buffer 14 to the signal splicer/multiplexer 16.

The splicer/multiplexer 16 splices the last first-signal group of pictures encoded before the splice with a first group of pictures in a second compression-encoded digital video signal 24b transmitted after the splice to provide a spliced signal 26. The first and second compression-encoded signals 24a, 24b are spliced during a switching interval that begins at a predetermined switching time T and ends at a splice point S, as shown in FIG. 2. The decoder 20 decodes the spliced signal 26 and reconstructs the video frames.

The controller 10 controls the operation of the encoder 12. In doing so, the controller 10 regulates the encoding rate and allocates the compressed bit-size for each frame.

The second compression-encoded digital video signal 24b may be provided from the same type of combination of encoder and controller as provides the first compression-encoded digital video signal 24a.

The bit-encoding rate can be variable. The encoder buffer 14 and the decoder buffer 20 each may contain more than one frame at any time in view of any variation in the bit-encoding rates and the variation in the sizes of each encoded video frame.

When a splice of first and second compression-encoded digital video signals encoded by different video signal services is scheduled to occur, in order for such splice to be seamless, all frames within the last first-signal group of pictures before the splice are encoded before a predetermined switching time T, at which a switching interval of duration SI commences, and the first frame of the first second-signal group of pictures following the splice is not transmitted until a splice time S, which occurs at the conclusion of the switching interval. See FIG. 2. No video frames are sent during the switching interval.

For the splice point to be seamless, the first frame of the first group of pictures of the second signal following the splice must have a predetermined vbv-delay. The vbv-delay is an interval between the time when the first bit of a frame enters the decoder buffer and the decoding time for that frame, as shown in FIG. 2.

The controller 10 so allocates the bit size for each frame as to cause the subjective visual quality to be uniform across all video frames. Some video frames require larger bit budgets than others due to the nature of their encoding frame types (e.g. I-frames, B-frames and P-frames), or because the pictures represented by such frames are more difficult to compress due to complex movements, changing brightness levels or scene changes in the pictures. Accordingly, the controller 10 allocates a bit budget for a current frame in a current group of pictures in accordance with the number of remaining bits for the current group of pictures, frame coefficients for different frame types and whether or not the current frame involves a scene change The controller 10 also so allocates the bit size for the different frames as to ensure that as the encoded frames are received, the decoder buffer 18 does not overflow or underflow. Decoder buffer underflow occurs when not all of the bits associated with a given video frame have arrived in the decoder buffer when the decoder begins to decode the given video frame. The controller 10 prevents underflow and overflow of the decoder buffer 18 by imposing respective maximum and minimum limits on the bit size of each video frame that the encoder 12 compresses.

Prior to encoding a current frame, the controller 10 determines minimum and maximum bit-sizes for the current frame for preventing overflow and underflow of the current frame from the decoder buffer 18 to the decoder 20 by estimating what the decoder buffer fullness DBF will be at the decoding time for the current frame in accordance with the bit-encoding rates and the bit sizes of the frames already encoded.

In order to prevent buffer underflow, the controller 10 determines the maximum bit size for the current frame as follows:

$$CF_{MAX} = DBF(dt/cf). \quad \{Eq.\ 1\}$$

wherein DBF(dt/cf) is an estimate of the decoder buffer fullness at the decoding time of the current frame.

$$DBF(dt/cf) = B(ct-dt) - EBF(ct) \quad \{Eq.\ 2\}$$

wherein B(ct-dt) is an estimate of the number of bits transmitted by the encoder buffer 14 from the current time until the decoding time of the current frame and EBF(ct) is the current fullness of the encoder buffer 14, as determined of a count of the bits in the already encoded frames that are still in the encoder buffer 14.

In order to prevent buffer overflow, the controller 10 determines the minimum bit size $CF_{MIN}$ for the current frame as follows:

$$CF_{MIN} = DBF(dt/cf) - DBF(dt/nf) + B(dt/cf-dt/nf) \quad \{Eq.\ 3\}$$

wherein DBF(dt/nf) is an estimate of the decoder buffer fullness at the decoding time of the next frame, which is determined in the same manner as DBF(dt/cf) for the current frame is determined in accordance with Eq. 1 and Eq. 2, and B(dt/cf-dt/nf) is an estimate of the number of bits transmitted by the encoder buffer 14 from the decoding time of the current frame until the decoding time of the next frame.

However, the above-described methods of determining the maximum and minimum bit sizes for the current frame of the first compression-encoded signal 24a are premised upon the assumption that the number of bits transmitted by the encoder buffer 14 from the decoding time of the current frame until the respective decoding times of the current frame and the next frame are known to the controller 10, which assumption in turn is premised upon the bit-encoding rate also being known to the controller 10. When the above-described method is used for encoding the frames of a group of pictures of a first compression-encoded digital video signal 24a that is to be spliced with a second compression-encoded digital video signal 24b that has a variable bit-encoding rate, the above-described method is not reliable for encoding a current frame that is not decoded until after the predetermined switching time T because the bit-encoding rate of the second encoded signal is not known to the controller 10 that is allocating the frame size of the first compression-encoded signal 24a.

SUMMARY OF THE INVENTION

The present invention provides a controller for allocating a bit size for a current frame in a group of pictures of a first compression-encoded digital video signal that is to be spliced following transmission of the group of pictures with a second compression-encoded digital video signal, wherein the signals are spliced during a switching interval that begins a predetermined switching time after commencement of encoding the current frame of the first signal, and the spliced signals are buffered by a decoder buffer and then decoded by a decoder, the controller comprising:

means for determining, prior to encoding the current frame, a maximum bit size for the current frame for preventing an underflow of the current frame from the decoder buffer to the decoder; and means for allocating a bit size for the current frame in accordance with the determined maximum bit size for the current frame;

wherein when the second signal has a variable bit-encoding rate and the current frame is not decoded until after the predetermined switching time, the maximum bit size is determined in accordance with an estimate of the decoder buffer fullness at the predetermined switching time.

The present invention also provides a controller for allocating a bit size for a current frame in a group of pictures of a first compression-encoded digital video signal that is to be spliced following transmission of the group of pictures with a second compression-encoded digital video signal, wherein the signals are spliced during a switching interval that begins a predetermined switching time after commencement of encoding the current frame of the first signal, and the spliced signals are buffered by a decoder buffer and then decoded by a decoder, the controller comprising:

means for determining, prior to encoding the current frame, a minimum bit size for the current frame for preventing an overflow of the current frame from the decoder buffer to the decoder; and means for allocating a bit size for the current frame in accordance with the determined minimum bit size for the current frame;

wherein when the second signal has a predetermined maximum variable bit-encoding rate and the current frame is not decoded until after the predetermined switching time, the minimum bit size is determined in accordance with the predetermined maximum bit-encoding rate of the second signal.

The present invention additionally provides a controller for allocating a bit budget for a current frame in a current group of pictures of a compression-encoded digital video signal, comprising:

means for determining a nominal bit budget for a current frame in accordance with the number of remaining bits for the current group of pictures, frame coefficients for different frame types and whether or not the current frame involves a scene change; and means for modifying the nominal bit budget for the frame by multiplying the nominal bit budget for the current frame by a scale factor, which is selected in accordance with whether or not a pending scene change within the current group of pictures beyond the current frame has been detected.

The present invention still further provides a controller for allocating a bit budget for a current frame in a current group of pictures of a compression-encoded digital video signal, comprising:

means for determining a bit budget for a current frame in accordance with the number of remaining bits for the current group of pictures; and means for determining the remaining bits when the current frame is in a group of pictures of a first compression-encoded digital video signal that is to be spliced following transmission of the group of pictures with a second compression-encoded digital video signal having a variable encoding rate, wherein the signals are spliced during a switching interval that begins a predetermined switching time after commencement of encoding the current frame of the first signal, the spliced signals are buffered by a decoder buffer and then decoded by a decoder, and the current frame is not decoded until after the predetermined switching time, the remaining bits being determined as an estimate of the decoder buffer fullness at the decoding time of the present frame minus the number of bits transmitted from the predetermined switching time until the decoding time of current frame.

The present invention also provides the allocation methods performed by the controller of the present invention and computer readable storage media comprising computer executable instructions for causing the controller to perform such methods.

Additional features of the present invention are described with reference to the detailed description of the preferred embodiments.

BRIEF DESCRIPTION OF THE DRAWING

FIG. 2 is not drawn to any scale.

DETAILED DESCRIPTION

Figure 1:
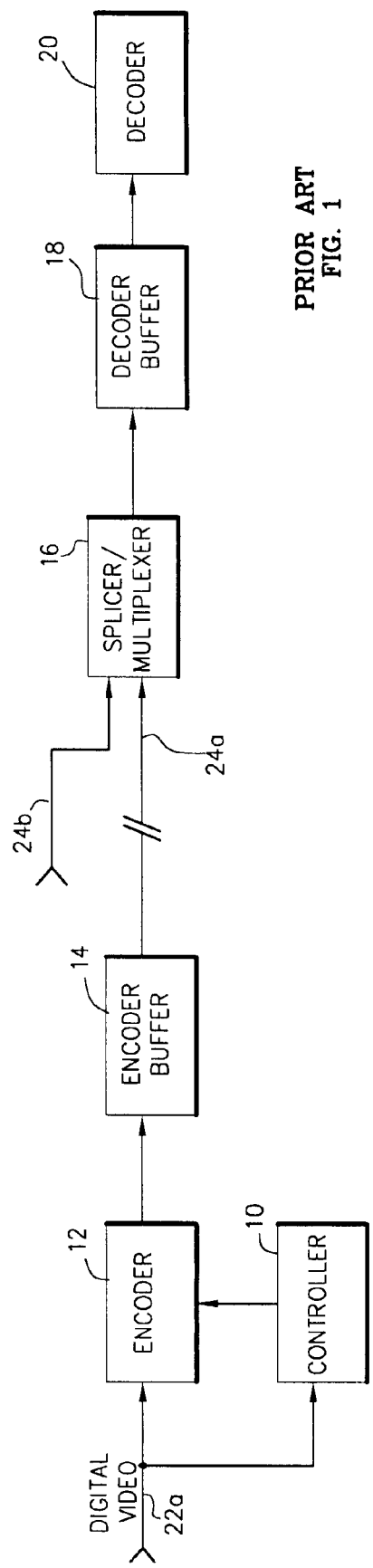
FIG. 1 is a block diagram showing a prior art digital video compression-and-decompression system that is adapted for splicing compression-encoded digital video signals.
Figure 2:
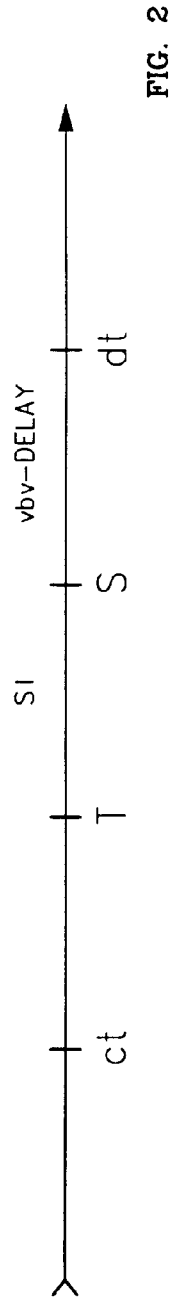
FIG. 2 is a diagram showing the sequential relationship of different times and intervals during the process of encoding, splicing and decoding compression-encoded digital video signals using the system of FIG. 1 when the current time of encoding a current frame is before a switching interval and the decoding time of the current frame is after the switching interval.
Figure 3:
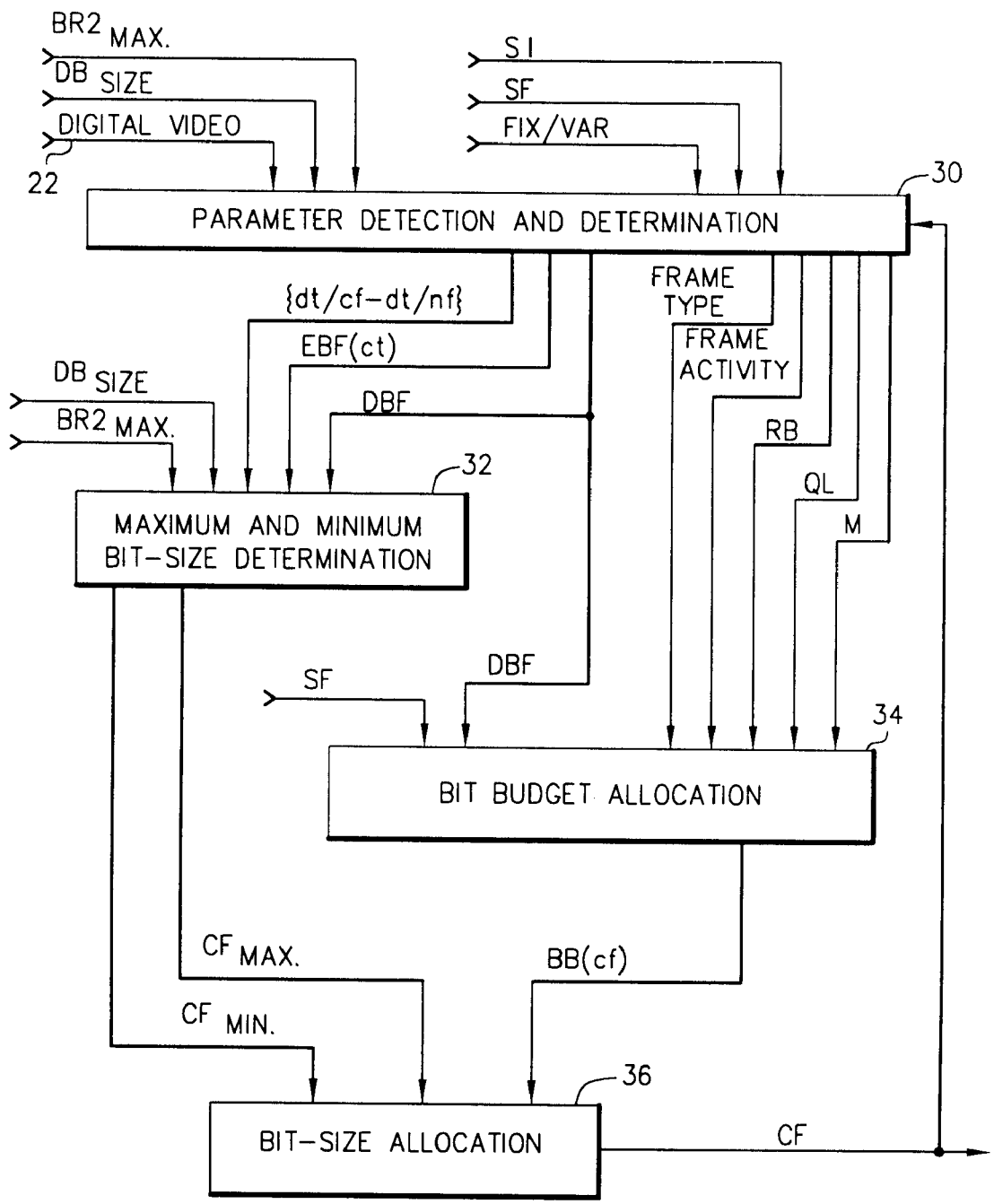
FIG. 3 is a diagram showing various parameters that are processed in different stages of the allocation methods performed by the controller in a preferred embodiment of the present invention.

Referring to FIG. 3, the controller of the present invention processes an input digital video signal that is to be transmitted 22 in combination with a number of static parameters $DB_{SIZE}$, $BR2_{MAX}$, SI, and SF and a FIX/VAR encoding mode setting in order to allocate a bit budget for the current frame BB(cf) and to determine maximum and minimum bit sizes for the current frame $CF_{MAX}$, $CF_{MIN}$ for preventing underflow and overflow of the current frame from the decoder buffer 18 to the decoder 20; and then allocates a bit size CF for the current frame in accordance with the allocated bit budget BB(cf) and the determined maximum and minimum bit sizes for the current frame $CF_{MAX}$, $CF_{MIN}$. $DB_{SIZE}$ is the size of the decoder buffer 18, $BR2_{MAX}$ is the maximum bit-encoding rate of the second compression-encoded digital video signal 24b, SI is the duration of the switching interval between the predetermined time T and the splice point S, and SF are scale factors. The FIX/VAR encoding mode setting indicates whether the encoding mode of the first and compression-encoded digital video signals 24a, 24b is fixed or variable.

The controller performs a parameter detection and determination routine 30 in which the controller 10 processes the input digital video signal 22 in combination and the static parameters $DB_{SIZE}$, $BR2_{MAX}$, SI, and SF and the FIX/VAR setting to detect various variable parameters including the frame type I, P or B, the frame mode coefficient M, and scene changes, and to determine various dynamic parameters including the decoder buffer fullness DBF at different times, the encoder buffer fullness EBF(ct) at the current time, the interval {dt/cf-dt/nf} from the decoding time of the current frame to the decoding time of the next frame, the quantization level QL of last previous compressed frame, the frame activity of different frames, and the number of remaining bits RB in the current group of pictures.

The controller 10 also performs a maximum-and-minimum bit-size determination routine 32 in which the controller 10 processes the static parameters $DB_{SIZE}$, $BR2_{MAX}$ with the dynamic parameters DBF, EBF(ct) and {dt/cf-dt/nf} to determine the maximum bit size for the current frame $CF_{MAX}$ and the minimum bit size for the current frame $CF_{MIN}$.

The controller 10 further performs a bit budget allocation routine 34 in which the controller 10 processes the static scale factor parameters SF and the detected frame type, mode coeffeicient M and scene change parameters with the dynamic parameters of DBF, QL, frame activity and RB to determine the bit budget for the current frame BB(cf).

Finally, the controller 10 performs a bit-size allocation routine 36, in which the processor 10 processes the allocated bit budget BB(cf) and the determined maximum and minimum bit sizes for the current frame $CF_{MAX}$, $CF_{MIN}$ to allocate the bit size CF for the current frame.

In the preferred embodiment, the decoding time for each new group of pictures encoded after a splice point S is the same for all of the different compression-encoded digital video signals encoded by different video signal services, and the first frame of each such new group of pictures is not encoded and sent to the decoder before a predetermined splice point S. Thus all the compression-encoded digital video signals encoded by different video signal services will have approximately the same vbv-delay.

Let frame(n) denote the first frame within the first group of pictures of the second signal before the splice, and let frame(m), frame(m+1), frame(m+2) . . . , and frame(n−1) denote the frames within the last group of pictures of the first signal before the splice, where frame(m) refers to the first frame in such last group of pictures whose decoding time (m) is after the predetermined switching time T. The bit-size allocations for this sequence of frames m, m+1, m+2, . . . n−1 have to be such that frame (n−1) is completely encoded before the predetermined switching time T.

When the current frame is not decoded until after the predetermined switching time T, the maximum bit size of the current frame $CF_{MAX}$ of the first signal is determined by the controller in accordance with an estimate of the decoder buffer fullness at the predetermined switching time T, which in turn is based upon an estimate of the number of first-signal bits to be transmitted between commencement of encoding the current frame and the predetermined switching time T, as follows:

$$CF_{MAX}=DBF(T)=B(ct-T)-EBF(ct) \quad \{Eq.\ 4\}$$

wherein DBF(T) is the decoder buffer fullness at the predetermined switching time T and B(ct-T) is the number of bits transmitted by the encoder buffer from the current time until the predetermined switching time T.

This method of determining the maximum bit size of the current frame $CF_{MAX}$ in accordance with Eq. 4 for frames that are not decoded until after the predetermined switching time T is applicable whether the bit-encoding rate of either or both of the first and second signals is a fixed rate or variable.

For each of the frames of the first signal that are to be decoded before the predetermined switching time T, the maximum bit size of the current frame $CF_{MAX}$ is determined by the controller in accordance with the method described above with reference to Eq. 1 and Eq. 2.

When the current frame is not decoded until after the predetermined switching time T, the minimum bit size of the current frame $CFM_{MIN}$ of the first signal is determined by the controller in accordance with the maximum bit-encoding rate $BR2_{MAX}$ of the second signal, as follows:

$$CF_{MIN}=DBF(dt/cf)WC+BR2_{MAX}\{dt/nf-dt/cf\}-DB_{SIZE} \quad \{Eq.\ 5\}$$

wherein $DBF(dt/cf)_{WC}$ is the worst case of decoder buffer fullness at the decoding time of the current frame, {dt/nf-dt/cf} is the interval from the decoding time for the current frame to the decoding time of the next frame and $DB_{SIZE}$ is the bit size of the decoder buffer.

$$DBF(dt/cf)_{WC}=B(ct-T)+BR2_{MAX}\{dt/cf-S\}-EBF(ct) \quad \{Eq.\ 6.\}$$

wherein B(ct−T) is the number of first-signal bits transmitted from the current time to the switching time T and {dt/cf−S} is the interval from the splice time S to the decoding time for the current frame.

For each of the frames of the first signal that are to be decoded before the predetermined switching time T, the minimum bit size of the current frame $CF_{MIN}$ is determined by the controller in accordance with the method described above with reference to Eq. 5.

The maximum bit-encoding rate may be set as a constant, in which case it should be set at less than or equal to the decoder buffer size divided by the vbvdelay. For example for a vbv-delay of 250 msec, and a decoder buffer size of 1.8 Mbits, the maximum bit-encoding rate should be set at 7.2 Mbps.

The above-described methods of determining the maximum and minimum bit sizes for the current frame are applicable to both fixed-rate and variable-rate encoding. For fixed-rate operations or in operations where the encoding is variable-rate but reverts to a fixed rate during spliced insertion of advertising spots, the maximum bit-encoding rate is simply set to the nominal encoding rate and the worst case decoder buffer fullness at the decoding time of the current frame, $DBF(dt/cf)_{WC}$ in Eq. 5, is the same as the decoder buffer fullness at the decoding time of the current frame, DBF(dt/cf).

A bit budget for each current frame BB(cf) in the last first-signal group of pictures before the splice is allocated by the controller in accordance with the number of bits allotted for the group of pictures AB(gop) containing the current frame, the number of available remaining bits RB in the group of pictures, any detected scene changes and frame coefficients for the different frame types I, P, B.

The bits allotted to the last first-signal group of pictures before the splice AB(gop) is calculated by a process known to those skilled in the art, such as described at pages 61–62 of "Test Model 5", Coded Representation of Picture and Audio Information, ISO/IEC JTC1/SC29/WG11, MPEG93/457, published by the International Organisation for Standardization, Telecommunication Standardization Sector, Study Group 15, Experts Group for ATM Video Encoding as Document AVC-491, Version 1, April 1993, and provided to the controller prior to encoding the group of pictures to enable the controller to allocate the bit budget for each current frame BB(cf). In said Document AVC-491, the symbols $T_i$, $T_p$ and $T_b$ are used to represent the bit budgets for the I, P and B frames respectively.

For fixed encoding-rate operation, before encoding each frame in the last first-signal group of pictures before the splice, the controller determines the available remaining bits RB in the group of pictures as follows:

$$RB=DBF(dt/cf)+B(dt/cf-T) \quad \{\text{Eq. 7}\}$$

wherein B(dt/cf-T) is the number of bits transmitted by the encoder buffer from the decoding time of current frame until the predetermined switching time T. In a fixed encoding-rate operation, this number of bits B(dt/cf-T) can be determined in advance of the current frame.

For variable encoding-rate operation, the method of Equation 7 is not applicable because such variation prevents advance determination of the number of bits B(dt/cf-T). Therefore, for such operation, for each frame that is to be decoded prior to the predetermined switching time T, the controller determines the bit budget for each frame of the different frame types in the group of pictures as follows:

$$BB(I)=\{[EBR/FR]c(B)c(P)\}/\{c(B)c(P)+N_Pc(I)c(B)+N_Bc(I)c(P)\} \quad \{\text{Eq. 8}\}$$

wherein EBR is the encoding bitrate, FR is the frame rate in frames per second, c(I), c(P) and c(B) are frame coefficients for the different frame types, $N_P$ is the number of P-frames in the group of pictures and $N_B$ is the number of B-frames in the group of pictures.

$$BB(P)=\{[EBR/FR]c(B)c(I)\}/\{c(B)c(P)+N_Pc(I)c(B)+N_Bc(I)c(P)\} \quad \{\text{Eq. 9}\}$$

$$BB(B)=\{[EBR/FR]c(I)c(P)\}/\{c(B)c(P)+N_Pc(I)c(B)+N_Bc(I)c(P)\} \quad \{\text{Eq. 10}\}$$

For variable encoding-rate operation, for each frame that is not to be decoded until after the predetermined switching time T, the controller determines the available remaining bits RB in the group of pictures as follows:

$$RB=DBF(dt/cf)-B(T-dt/cf) \quad \{\text{Eq. 11}\}$$

wherein B(T-dt/cf) is the number of bits transmitted by the encoder buffer from the predetermined switching time T until the decoding time of current frame.

For the purpose of bit budget determination, the controller also determines the number of P and B frames remaining in the current group of pictures RN, as follows:

$$RN_P=\{(\text{number of frames in current group of pictures})-(\text{number of frames already encoded in current group of pictures})\}/M \quad \{\text{Eq. 12}\}$$

wherein M is a mode coefficient, with M=1 when all of the frames after the I frame are P-frames, M=2, when there are equal numbers of P-frames and B-frames, and M=3, when there are twice as many B-frames as P-frames.

$$RN_B=(\text{number of frames in current group of pictures})-(\text{number of frames already encoded in current group of pictures})-RN_P. \quad \{\text{Eq. 13}\}$$

The respective frame coefficients c(I), c(P), c(B) are proportional to the inverse of the frame complexity for the different I, P, B frame types. The complexity is determined by multiplying the square root of the average quantization level $QL_{AVG}$ times the number of bits used in the last previous frame B(pf) of the same type. The average quantization level is based upon the last previous compressed frame of whichever type. After each previous frame is encoded, the frame coefficient of the same type is updated before computing the bit budget for the current frame, as follows:

$$c(I)=1/\{(QL_{AVG})^{1/2} \times B(pf/I)\} \quad \{\text{Eq. 14}\}$$

$$c(P)=1/\{(QL_{AVG})^{1/2} \times B(pf/P)\} \quad \{\text{Eq. 15}\}$$

$$c(B)=1/\{(QL_{AVG})^{1/2} \times B(pf/B)\} \quad \{\text{Eq. 16}\}$$

These frame coefficients are different from those in the commonly used MPEG2 test model, in which complexity is determined by multiplying the average quantization level by the frame size of the last previous compressed frame. The square root function gives a more stable complexity measurement across a wide range of quantization levels.

Since the above set of frame coefficients c(I), c(P), c(B) are determined in accordance with the complexities of previously encoded frames, when there is a scene change in the current frame, these frame coefficients no longer accurately represent the complexity of the new scene. Therefore at the point of a scene change, the coefficients are reset to values that better represent the new scene, as follows:

$$c(I)=prior\ c(I) \times \{\text{previous I-frame activity/current frame activity}\} \quad \{\text{Eq. 17}\}$$

$$c(P)=c(I) \times 2 \quad \{\text{Eq. 18}\}$$

$$c(B)=\text{minimum of either } c(I) \times 4 \text{ or the prior } c(B) \quad \{\text{Eq. 19}\}$$

Frame activity computation is described in Section 6.5.6 at page 34 of "Test Model 3", Coded Representation of Picture and Audio Information, ISO/IEC JTC1/SC29/WG11, N0328, published by the International Organisation for Standardization, CCITT SG XV, Working Party XV/1, Experts Group for ATM Video Encoding as Document AVC-400, November 1992.

Processes for detecting future frames in which the scene changes are known to those skilled in the art. The preferred process of future scene-change detection is described in International Patent Application No. PCT/US99/19804, the pertinent disclosure of which is incorporated herein by reference thereto. The named inventor in Application No. PCT/US99/19804, Sui-Wai Wu, is a joint inventor in the present application. This preferred process can predict a scene change up to six frames before of the current frame. Use of pending scene-change information improves the bit-budget allocation method and provides better video quality performance at scene cuts.

Once the set of frame coefficients are up to date, a bit budget for the current frame is determined by modifying a nominal bit budget for the frame by multiplying the nominal bit budget by a given scale factor kc or km, which is selected in accordance with whether or not a pending scene change within the current group of pictures beyond the current frame has been detected.

The nominal bit budgets for the different frame types are determined as follows:

$$BB(I)=\{RB\ c(B)c(P)\}/\{c(B)c(P)+N_Pc(I)c(B)+N_Bc(I)c(P)\} \quad \{\text{Eq. 20}\}$$

When the current P-frame involves a scene change, $$BB(P)=\{RB\ c(B)c(P)\}/\{c(B)c(P)+[RN_P-1]c(I)c(B)+RN_Bc(I)c(P)\} \quad \{\text{Eq. 21}\}$$

When the current P-frame does not involve a scene change, $$BB(P)=\{RB\ c(B)\}/\{RN_Pc(B)+RN_Bc(P)\} \quad \{\text{Eq. 22}\}$$

$$BB(B)=\{RB\ c(P)\}/\{RN_Pc(B)+RN_Bc(P)\} \quad \{\text{Eq. 23}\}$$

If a pending scene change within the current group of pictures beyond the current frame has not been detected, the bit budget for the current frame is determined as follows:

$$BB(I/cf)=BB(I)\times km \quad \{\text{Eq. 24}\}$$

$$BB(P/cf)=BB(P)\times km \quad \{\text{Eq. 25}\}$$

$$BB(B/cf)=BB(B)\times km \quad \{\text{Eq. 26}\}$$

If a pending scene change within the current group of pictures beyond the current frame has been detected, the bit budget for the current frame is determined as follows:

$$BB(I/cf)=BB(I)\times kc \quad \{\text{Eq. 27}\}$$

$$BB(P/cf)=BB(P)\times kc \quad \{\text{Eq. 28}\}$$

$$BB(B/cf)=BB(B)\times kc \quad \{\text{Eq. 29}\}$$

The scale factors used in the preferred embodiment are as follows:

$$km=ka-(ka-kb)(\text{frames encoded in current group of pictures})/(\text{total number of frames in current group of pictures}). \quad \{\text{Eq. 30}\}$$

ka=0.95
kb=0.75
kc=0.5

The bit size used for encoding the current frame is allocated in accordance with the bit budget determined in accordance with the appropriate one of Equations 24–29 and the maximum and minimum bit sizes determined in accordance with Equations 4 and 5.

The controller is embodied in a computer that has been programmed by computer readable storage media comprising computer executable instructions for causing the controller to perform the functions of the controller described herein.

The advantages specifically stated herein do not necessarily apply to every conceivable embodiment of the present invention. Further, such stated advantages of the present invention are only examples and should not be construed as the only advantages of the present invention.

While the above description contains many specificities, these should not be construed as limitations on the scope of the present invention, but rather as examples of the preferred embodiments described herein. Other variations are possible and the scope of the present invention should be determined not by the embodiments described herein but rather by the claims and their legal equivalents.

We claim:

1. A controller for allocating a bit size for a current frame in a group of pictures of a first compression-encoded digital video signal that is to be spliced following transmission of the group of pictures with a second compression-encoded digital video signal, wherein the signals are spliced during a switching interval that begins a predetermined switching time after commencement of encoding the current frame of the first signal, and the spliced signals are buffered by a decoder buffer and then decoded by a decoder, the controller comprising:

means for determining, prior to encoding the current frame, a maximum bit size for the current frame for preventing an underflow of the current frame from the decoder buffer to the decoder; and means for allocating a bit size for the current frame in accordance with the determined maximum bit size for the current frame;

wherein when the second signal has a variable bit-encoding rate and the current frame is not decoded until after the predetermined switching time, the maximum bit size is determined in accordance with an estimate of the decoder buffer fullness at the predetermined switching time.

2. A controller according to claim 1, wherein the estimate of the decoder buffer fullness at the predetermined switching time is based upon an estimate of the number of first-signal bits to be transmitted between commencement of encoding the current frame and the predetermined switching time.

3. A controller according to claim 1, wherein the estimate of the decoder buffer fullness at the predetermined switching time is equal to an estimate of the number of first-signal bits to be transmitted between commencement of encoding the current frame and the predetermined switching time minus the fullness of an encoder output buffer upon commencement of encoding the current frame.

4. A controller according to claim 1, further comprising:

means for determining, prior to encoding the current frame, a minimum bit size for the current frame for preventing an overflow of the current frame from the decoder buffer to the decoder;

wherein the allocating means allocate the bit size for the current frame in accordance with the determined maximum and minimum bit sizes for the current frame; and wherein when the second signal has a predetermined maximum variable bit-encoding rate and the current frame is not decoded until after the predetermined switching time, the minimum bit size is determined in accordance with the predetermined maximum bit-encoding rate of the second signal.

5. A controller according to claim 1, wherein the controller allocates a bit size for encoding the current frame in accordance with the determined maximum and minimum bit sizes and an allocated bit budget for the current frame; and wherein the controller allocates the bit budget for the current frame by determining a nominal bit budget for the current frame in accordance with the number of remaining bits for the current group of pictures, frame coefficients for different frame types, and whether or not the current frame involves a scene change; and by modifying the nominal bit budget for the frame by multiplying the nominal bit budget for the current frame by a scale factor, which is selected in accordance with whether or not a pending scene change within the current group of pictures beyond the current frame has been detected.

6. A controller according to claim 1, wherein the controller allocates a bit size for encoding the current frame in accordance with the determined maximum and minimum bit sizes and an allocated bit budget for the current frame; and wherein the controller allocates the bit budget for the current frame by determining a bit budget for the current frame in accordance with the number of remaining bits for the current group of pictures, and by determining the remaining bits as an estimate of the decoder buffer fullness at the decoding time of the present frame minus the number of bits transmitted from the predetermined switching time until the decoding time of current frame.

7. A controller for allocating a bit size for a current frame in a group of pictures of a first compression-encoded digital video signal that is to be spliced following transmission of the group of pictures with a second compression-encoded digital video signal, wherein the signals are spliced during a switching interval that begins a predetermined switching time after commencement of encoding the current frame of the first signal, and the spliced signals are buffered by a decoder buffer and then decoded by a decoder, the controller comprising:

means for determining, prior to encoding the current frame, a minimum bit size for the current frame for preventing an overflow of the current frame from the decoder buffer to the decoder; and means for allocating a bit size for the current frame in accordance with the determined minimum bit size for the current frame;

wherein when the second signal has a predetermined maximum variable bit-encoding rate and the current frame is not decoded until after the predetermined switching time, the minimum bit size is determined in accordance with the predetermined maximum bit-encoding rate of the second signal.

8. A controller according to claim 7, wherein when the second signal has a predetermined maximum variable bit-encoding rate and the current frame is not decoded until after the predetermined switching time, the minimum bit size is determined as an estimate of the worst case of decoder buffer fullness at the decoding time of the current frame plus the product of the predetermined maximum bit-encoding rate of the second signal and the interval from the decoding time of the current frame to the decoding time of the next frame minus the decoder buffer size.

9. A controller according to claim 8, wherein the estimate of the worst case of decoder buffer fullness at the decoding time of the current frame is equal to an estimate of the number of first-signal bits transmitted from commencement of encoding the current frame until the predetermined switching time plus the product of the predetermined maximum bit-encoding rate of the second signal and the interval from the end of the switching interval until the decoding time of the current frame minus the fullness of an encoder output buffer upon commencement of encoding the current frame.

10. A controller for allocating a bit budget for a current frame in a current group of pictures of a compression-encoded digital video signal, comprising:

means for determining a nominal bit budget for a current frame in accordance with the number of remaining bits for the current group of pictures, frame coefficients for different frame types and whether or not the current frame involves a scene change; and means for modifying the nominal bit budget for the frame by multiplying the nominal bit budget for the current frame by a scale factor, which is selected in accordance with whether or not a pending scene change within the current group of pictures beyond the current frame has been detected.

11. A controller for allocating a bit budget for a current frame in a current group of pictures of a compression-encoded digital video signal, comprising:

means for determining a bit budget for a current frame in accordance with the number of remaining bits for the current group of pictures; and means for determining the remaining bits when the current frame is in a group of pictures of a first compression-encoded digital video signal that is to be spliced following transmission of the group of pictures with a second compression-encoded digital video signal having a variable encoding rate, wherein the signals are spliced during a switching interval that begins a predetermined switching time after commencement of encoding the current frame of the first signal, the spliced signals are buffered by a decoder buffer and then decoded by a decoder, and the current frame is not decoded until after the predetermined switching time, the remaining bits being determined as an estimate of the decoder buffer fullness at the decoding time of the present frame minus the number of bits transmitted from the predetermined switching time until the decoding time of current frame.

12. A method of allocating a bit size for a current frame in a group of pictures of a first compression-encoded digital video signal that is to be spliced following transmission of the group of pictures with a second compression-encoded digital video signal, wherein the signals are spliced during a switching interval that begins a predetermined switching time after commencement of encoding the current frame of the first signal, and the spliced signals are buffered by a decoder buffer and then decoded by a decoder, the method comprising the steps of:

(a) determining, prior to encoding the current frame, a maximum bit size for the current frame for preventing an underflow of the current frame from the decoder buffer to the decoder; and (b) allocating a bit size for the current frame in accordance with the determined maximum bit size for the current frame;

wherein when the second signal has a variable bit-encoding rate and the current frame is not decoded until after the predetermined switching time, step (a) comprises step of:

(c) determining the maximum bit size in accordance with an estimate of the decoder buffer fullness at the predetermined switching time.

13. A method according to claim 12, wherein the estimate of the decoder buffer fullness at the predetermined switching time is based upon an estimate of the number of first-signal bits to be transmitted between commencement of encoding the current frame and the predetermined switching time.

14. A method according to claim 12, wherein the estimate of the decoder buffer fullness at the predetermined switching time is equal to an estimate of the number of first-signal bits to be transmitted between commencement of encoding the current frame and the predetermined switching time minus the fullness of an encoder output buffer upon commencement of encoding the current frame.

15. A method according to claim 12, further comprising the step of:

(d) determining, prior to encoding the current frame, a minimum bit size for the current frame for preventing an overflow of the current frame from the decoder buffer to the decoder;

wherein step (c) includes allocating the bit size for the current frame in accordance with the determined maximum and minimum bit sizes for the current frame; and wherein when the second signal has a predetermined maximum variable bit-encoding rate and the current frame is not decoded until after the predetermined switching time, step (d) comprises the step of:
(e) determining the minimum bit size in accordance with the predetermined maximum bit-encoding rate of the second signal.

16. A method according to claim 12, further comprising the step of:
(e) allocating a bit size for encoding the current frame in accordance with the determined maximum and minimum bit sizes and an allocated bit budget for the current frame;
wherein the bit budget for the current frame is allocated by the steps of:
(f) determining a nominal bit budget for the current frame in accordance with the number of remaining bits for the current group of pictures, frame coefficients for different frame types, and whether or not the current frame involves a scene change; and
(g) modifying the nominal bit budget for the frame by multiplying the nominal bit budget for the current frame by a scale factor, which is selected in accordance with whether or not a pending scene change within the current group of pictures beyond the current frame has been detected.

17. A method according to claim 12, further comprising the step of:
(e) allocating a bit size for encoding the current frame in accordance with the determined maximum and minimum bit sizes and an allocated bit budget for the current frame;
wherein the bit budget for the current frame is allocated by the steps of:
(f) determining a bit budget for the current frame in accordance with the number of remaining bits for the current group of pictures; and
(g) determining the remaining bits as an estimate of the decoder buffer fullness at the decoding time of the present frame minus the number of bits transmitted from the predetermined switching time until the decoding time of current frame.

18. A method of allocating a bit size for a current frame in a group of pictures of a first compression-encoded digital video signal that is to be spliced following transmission of the group of pictures with a second compression-encoded digital video signal, wherein the signals are spliced during a switching interval that begins a predetermined switching time after commencement of encoding the current frame of the first signal, and the spliced signals are buffered by a decoder buffer and then decoded by a decoder, the method comprising the steps of:
(a) determining, prior to encoding the current frame, a minimum bit size for the current frame for preventing an overflow of the current frame from the decoder buffer to the decoder; and
(b) allocating a bit size for the current frame in accordance with the determined minimum bit size for the current frame;
wherein when the second signal has a predetermined maximum variable bit-encoding rate and the current frame is not decoded until after the predetermined switching time, step (b) comprises the step of:
(c) determining the minimum bit size in accordance with the predetermined maximum bit-encoding rate of the second signal.

19. A method according to claim 18, wherein step (c) comprises the step of:
(d) determining the minimum bit size as an estimate of the worst case of decoder buffer fullness at the decoding time of the current frame plus the product of the predetermined maximum bit-encoding rate of the second signal and the interval from the decoding time of the current frame to the decoding time of the next frame minus the decoder buffer size.

20. A method according to claim 19, wherein the estimate of the worst case of decoder buffer fullness at the decoding time of the current frame is equal to the number of first-signal bits transmitted from commencement of encoding the current frame until the predetermined switching time plus the product of the predetermined maximum bit-encoding rate of the second signal and the interval from the end of the switching interval until the decoding time of the current frame minus the fullness of an encoder output buffer upon commencement of encoding the current frame.

21. A method of allocating a bit budget for a current frame in a current group of pictures of a compression-encoded digital video signal, comprising the steps of:
(a) determining a nominal bit budget for a current frame in accordance with the number of remaining bits for the current group of pictures, frame coefficients for different frame types and whether or not the current frame involves a scene change; and
(b) modifying the nominal bit budget for the frame by multiplying the nominal bit budget for the current frame by a scale factor, which is selected in accordance with whether or not a pending scene change within the current group of pictures beyond the current frame has been detected.

22. A method of allocating a bit budget for a current frame in a current group of pictures of a compression-encoded digital video signal, comprising the steps of:
(a) determining a bit budget for a current frame in accordance with the number of remaining bits for the current group of pictures; and
(b) when the current frame is in a group of pictures of a first compression-encoded digital video signal that is to be spliced following transmission of the group of pictures with a second compression-encoded digital video signal having a variable encoding rate, wherein the signals are spliced during a switching interval that begins a predetermined switching time after commencement of encoding the current frame of the first signal, the spliced signals are buffered by a decoder buffer and then decoded by a decoder, and the current frame is not decoded until after the predetermined switching time, determining the remaining bits as an estimate of the decoder buffer fullness at the decoding time of the present frame minus the number of bits transmitted from the predetermined switching time until the decoding time of current frame.

23. A computer readable storage medium comprising computer executable instructions for causing a controller to allocate a bit size for a current frame in a group of pictures of a first compression-encoded digital video signal that is to be spliced following transmission of the group of pictures with a second compression-encoded digital video signal, wherein the signals are spliced during a switching interval that begins a predetermined switching time after commencement of encoding the current frame of the first signal, and the spliced signals are buffered by a decoder buffer and then decoded by a decoder, wherein the instructions cause the controller to perform the steps of:

(a) determining, prior to encoding the current frame, a maximum bit size for the current frame for preventing an underflow of the current frame from the decoder buffer to the decoder; and (b) allocating a bit size for the current frame in accordance with the determined maximum bit size for the current frame;

wherein when the second signal has a variable bit-encoding rate and the current frame is not decoded until after the predetermined switching time, step (a) comprises step of:

(c) determining the maximum bit size in accordance with an estimate of the decoder buffer fullness at the predetermined switching time.

24. A computer readable storage medium according to claim 23, further comprising computer executable instructions for causing a controller to perform the steps of:

(d) determining, prior to encoding the current frame, a minimum bit size for the current frame for preventing an overflow of the current frame from the decoder buffer to the decoder;

wherein step (c) includes allocating the bit size for the current frame in accordance with the determined maximum and minimum bit sizes for the current frame; and wherein when the second signal has a predetermined maximum variable bit-encoding rate and the current frame is not decoded until after the predetermined switching time, step (d) comprises the step of:

(e) determining the minimum bit size in accordance with the predetermined maximum bit-encoding rate of the second signal.

25. A computer readable storage medium according to claim 22, further comprising computer executable instructions for causing a controller to perform the steps of:

(e) allocating a bit size for encoding the current frame in accordance with an allotted number of bits for the group of pictures, the determined maximum and minimum bit sizes and an allocated bit budget for the current frame;

wherein the bit budget for the current frame is allocated by the steps of:

(f) determining a nominal bit budget for the current frame in accordance with the number of remaining bits for the current group of pictures, frame coefficients for different frame types, and whether or not the current frame involves a scene change; and (g) modifying the nominal bit budget for the frame by multiplying the nominal bit budget for the current frame by a scale factor, which is selected in accordance with whether or not a pending scene change within the current group of pictures beyond the current frame has been detected.

26. A computer readable storage medium comprising computer executable instructions for causing a controller to allocate a bit size for a current frame in a group of pictures of a first compression-encoded digital video signal that is to be spliced following transmission of the group of pictures with a second compression-encoded digital video signal, wherein the signals are spliced during a switching interval that begins a predetermined switching time after commencement of encoding the current frame of the first signal, and the spliced signals are buffered by a decoder buffer and then decoded by a decoder, wherein the instructions cause the controller to perform the steps of:

(a) determining, prior to encoding the current frame, a minimum bit size for the current frame for preventing an overflow of the current frame from the decoder buffer to the decoder; and (b) allocating a bit size for the current frame in accordance with the determined minimum bit size for the current frame;

wherein when the second signal has a predetermined maximum variable bit-encoding rate and the current frame is not decoded until after the predetermined switching time, step (b) comprises the step of:

(c) determining the minimum bit size in accordance with the predetermined maximum bit-encoding rate of the second signal.

27. A computer readable storage medium comprising computer executable instructions for causing a controller to allocate a bit budget for a current frame in a current group of pictures of a compression-encoded digital video signal, wherein the instructions cause the controller to perform the steps of:

(a) determining a nominal bit budget for a current frame in accordance with the number of remaining bits for the current group of pictures, frame coefficients for different frame types and whether or not the current frame involves a scene change; and (b) modifying the nominal bit budget for the frame by multiplying the nominal bit budget for the current frame by a scale factor, which is selected in accordance with whether or not a pending scene change within the current group of pictures beyond the current frame has been detected.

28. A computer readable storage medium comprising computer executable instructions for causing a controller to allocate a bit budget for a current frame in a current group of pictures of a compression-encoded digital video signal, wherein the instructions cause the controller to perform the steps of:

(a) determining a bit budget for a current frame in accordance with the number of remaining bits for the current group of pictures; and (b) when the current frame is in a group of pictures of a first compression-encoded digital video signal that is to be spliced following transmission of the group of pictures with a second compression-encoded digital video signal having a variable encoding rate, wherein the signals are spliced during a switching interval that begins a predetermined switching time after commencement of encoding the current frame of the first signal, the spliced signals are buffered by a decoder buffer and then decoded by a decoder, and the current frame is not decoded until after the predetermined switching time, determining the remaining bits as an estimate of the decoder buffer fullness at the decoding time of the present frame minus the number of bits transmitted from the predetermined switching time until the decoding time of current frame.

* * * * *

UNITED STATES PATENT AND TRADEMARK OFFICE
CERTIFICATE OF CORRECTION

PATENT NO.    : 6,694,060 B2                                    Page 1 of 1
DATED         : February 17, 2004
INVENTOR(S)   : Vincent Liu et al.

It is certified that error appears in the above-identified patent and that said Letters Patent is hereby corrected as shown below:

Column 6,
Line 28, "$DFB(dt/cf)WC$" should read -- $DFB(dt/cf)_{WC}$ --.

Column 9,
Line 9, -- = -- should be inserted after "$BB(P)$".

Signed and Sealed this

First Day of June, 2004

JON W. DUDAS
*Acting Director of the United States Patent and Trademark Office*